United States Patent [19]

MacMurray

[11] 3,861,901

[45] Jan. 21, 1975

[54] PLANT GROWTH REGULATION

[76] Inventor: Robert R. MacMurray, 550 East Third St., Bloomsburg, Pa. 17815

[22] Filed: Oct. 4, 1971

[21] Appl. No.: 186,508

Related U.S. Application Data

[63] Continuation-in-part of Ser. No. 815,493, April 11, 1969, Pat. No. 3,697,253.

[52] U.S. Cl................ 71/103, 71/116, 71/117, 71/121
[51] Int. Cl............................................ A01n 9/14
[58] Field of Search .............. 71/117, 121, 103, 108

[56] References Cited
UNITED STATES PATENTS

| | | | |
|---|---|---|---|
| 2,258,291 | 10/1941 | Jones | 71/77 |
| 2,322,761 | 6/1943 | Lontz | 71/77 |
| 2,390,941 | 12/1945 | Jones | 71/117 |
| 2,573,769 | 11/1951 | Lambrech | 71/77 |
| 2,585,875 | 2/1952 | Swaney et al. | 71/77 |
| 2,690,388 | 9/1954 | Hale | 71/77 |
| 3,083,089 | 3/1963 | Rennen | 71/DIG. 1 |
| 3,257,190 | 6/1966 | Sopen | 71/121 |
| 3,567,421 | 3/1971 | Page et al. | 71/77 |
| 3,697,253 | 10/1972 | MacMurray | 71/117 |

*Primary Examiner*—James O. Thomas, Jr.
*Attorney, Agent, or Firm*—Max R. Millman, Esq.

[57] ABSTRACT

Plant growth regulant compositions and methods of stimulating the growth of herbaceous and woody stemmed plants, particularly peppers, tomatoes, alfalfa, soybeans and Douglas Firs, using N,N-di-n-propyl-4-trifluoromethyl-2,6-dinitroaniline in a relatively wide range of concentrations alone or in combination with 2,4-dichlorophenoxyacetic acid, 2-methyl-4-chlorophenoxyacetic acid, 2(2,4,5-trichlorophenoxy)propionic acid, sodium 2,4-dichlorophenoxyethyl sulfate and p-chlorophenoxyacetic acid.

10 Claims, No Drawings

PLANT GROWTH REGULATION

This invention relates to plant growth regulation, particularly stimulation, and is a continuation-in-part of my copending application Ser. No. 815,493 493 filed Apr. 11, 1969, now U.S. Pat. No. 3,697,253.

Said parent application discloses the discovery that the herbicide N,N-di-n-propyl-4-trifluoromethyl-2,6-dinitroaniline, known generally as trifluralin, stimulated the growth of herbaceous and woody stemmed plants and increased crop yield when applied thereto in concentrations and amounts sufficient to effect growth stimulation. Said parent application also discloses plant growth stimulation when trifluralin is combined with cacodylic acid and/or 2,4-dichlorophenoxyacetic acid (2,4-D) and/or 2,4,5-trichlorophenoxyacetic acid (2,4,5-T).

The instant invention is based on the discovery that the growth stimulation of herbaceous and woody stemmed plants can be effected over a relatively wide concentration of the trifluralin, alone or in combination with 2,4-D and other herbicides, such as 2-methyl-4-chlorophenoxyacetic acid, 2(2,4,5-trichlorophenoxy)propionic acid, sodium 2,4-dichlorophenoxyethyl sulfate and p-chlorophenoxyacetic acid.

The instant invention is also based on the discovery that growth stimulation is particularly effective when the foregoing compounds and compositions are applied to particular herbaceous plants such as peppers, tomatoes, alfalfa and soybeans and the woody stemmed plant Douglas Fir.

The instant invention is further based on the discovery that certain combinations of the compounds exert a synergistic effect on the plant growth, particularly on Douglas Firs.

The instant invention is also based on the discovery that the serial applications of certain compounds effects a growth stimulation in excess of that obtained by a single application of a composition containing an admixture of the compounds.

Hence, the primary object of the invention is to provide compositions of normally herbicidal compounds and methods of applying said compounds and compositions to herbaceous plants, particularly the hardy and easy to handle peppers, the sensitive tomatoes and major commercial crops such as alfalfa and soybeans and to woody stemmed plants such as the very useful Douglas Firs in a relatively wide range of concentrations and amounts to stimulate plant growth and increase crop yields.

The following examples are non-limitative illustrations of the invention and the results obtained thereby.

EXAMPLE 1

The following compounds and compositions:

Compound A, N,N-di-n-propyl-4-trifluoromethyl-2,6-dinitroaniline — generically named trifluralin —, Compound B, 2,4-dichlorophenoxyacetic acid — commonly called 2,4-D —, Compound C, 2-methyl-4-chlorophenoxyacetic acid — commonly called MCPA acid —, Compound D, 2(2,4,5-trichlorophenoxy)propionic acid — also known as silvex —, Compound E, Sodium 2,4-dichlorophenoxyethyl sulfate — also known as Sesone —, Compound F, P-chlorophenoxyacetic acid — commonly called P-chloro —, and Compositions AB, AC, AD, AE and AF were added to a mixture of the surfactant Tween number 20, water and butanol where necessary, in accordance with the proportions by weight given below in Table A to obtain concentrates with stated concentrations for the compounds and compositions used.

TABLE A

| CMPD (CMPN) | PURE CMPD (CMPN) WT. GRAMS | TWEEN NO. 20 WT. IN GRAMS | WATER WT. IN GRAMS | BUTANOL WT. IN GRAMS | CONC. OF CMPD (CMPN) Mg/Ml |
|---|---|---|---|---|---|
| A | 25.0 | 177.5 | 177.5 | 88.8 | 51.5 |
| B | 40.0 | 183.2 | 183.2 | 91.6 | 84.3 |
| C | 40.0 | 183.8 | 183.8 | 91.9 | 83.4 |
| D | 4.0 | 38.3 | 38.3 | 19.2 | 43.5 |
| E | 7.5 | 45.8 | 45.8 | — | 95.0 |
| F | 41.0 | 183.2 | 183.2 | 91.6 | 87.6 |
| AB |  | 164.7 | 164.7 | 82.4 |  |
| A | 25.0 |  |  |  | 51.5 |
| B | 40.0 |  |  |  | 82.4 |
| AC |  | 161.3 | 161.3 | 80.6 |  |
| A | 25.0 |  |  |  | 50.0 |
| C | 40.0 |  |  |  | 84.3 |
| AD |  | 33.8 | 33.8 | 16.9 |  |
| A | 5.0 |  |  |  | 55.6 |
| D | 4.0 |  |  |  | 44.4 |
| AE |  | 32.2 | 32.2 | 16.1 |  |
| A | 5.0 |  |  |  | 56.8 |
| E | 8.0 |  |  |  | 86.4 |
| AF |  | 160.7 | 160.7 | 80.4 |  |
| A | 25.0 |  |  |  | 53.8 |
| F | 40.0 |  |  |  | 83.3 |

The source of compound A was Treflan, a liquid product of Eli Lilly Co. containing 44.5 % by weight of trifluralin and 55.5 % by weight of inert ingredients (petroleum distillates). Hence, 56.2 gms of Treflan was used to provide 25 gms of pure trifluralin. The remaining compounds B, C, D, E and F were available commercially in purities of upwards of 90 %. Thus B was 95 % pure (est.) and 42.0 gms were used to provide 40.0 gms pure B, C was 98.6% pure and 40.6 gms was used to provide 40.0 gms pure C, D. was 95 % pure and 4.2 gms was used to provide 4.0 gms pure D, E was 90% pure and 8.4 gms was used to provide 7.5 gms pure E, and F was 98% and 42.0 gms was used to provide 41.0 gms pure E. Concentrates of compounds A, D and composition AD were clear yellow solutions. Concentrates of the remaining compounds and compositions, namely B, C, D, E, F, AB, AC, AE and AF were thin emulsions.

Spray solutions were prepared, with 0.1 cc., 1.00 cc. and 10.00 cc. of concentrate, of each compound and composition, by placing 473 cc. of tap water into amber 500 cc. bottles, and then using separate syringes measuring the appropriate amount of concentrate into its respective labeled bottle. 0.2 cc., 2.0 cc. of the concentrates were used in making up the spray solutions of E and AE and were therefore twice as strong as the other solutions. This must be kept in mind in interpretingg the subsequent tables.

The spray solutions using 0.1 cc./pint of water contained the following approximate parts per million of active ingredient or ingredients:

|   | 0.1 cc. Strength |   | 0.1 cc. Strength |
|---|---|---|---|
| A | 10.86 ppm | AB, A | 10.86 ppm |
|   |   | B | 17.42 ppm |
| B | 17.82 ppm | AC, A | 10.69 ppm |
|   |   | C | 17.82 ppm |
| C | 17.63 ppm | AD, A | 11.74 ppm |
|   |   | D | 9.38 ppm |
| D | 9.19 ppm | AE, A | 24.02 ppm |
|   |   | E | 36.52 ppm |
| E | 40.16 ppm | AF, A | 11.39 ppm |
|   |   | F | 17.61 ppm |
| F | 18.54 ppm |   |   |

It will be noted that the concentrations of the ingredients using 1.0 cc./pint of water are 10 times those stated above, and the concentrations using 10.0 cc./pint of water are 100 times those stated above.

In the course of the experiments, it was necessary to make up fresh spray solutions. When that had to be done, the appropriate bottles were washed with detergent, and rinsed seven times in warm, running water. New and separate syringes were used at all times to avoid contamination. Finally, enough Tween number 20 was added to each bottle of spray solution to approximate 1% Tween number 20 in the spray, and sufficient concentrated hydrochloric acid was put in each spray solution to render it acidic.

The following were seeded in a greenhouse, not in the spring but rather in early summer, using Jiffy-7 pellets, a product of Jiffy Pot Ltd. of Grorud, Norway containing peat moss and nutrient compounds:
1. 7 flats of 56 pellets with California Wonder peppers (392 pellets, 2 seeds/pellet, 784 plants);
2. 3 flats of 56 pellets with Tiny Tim tomatoes, (168 pellets, 2 seeds each, 336 plants);
3. 3 flats of 56 pellets with Adelphia Strain soybeans (168 pellets, 2 seeds each, 336 plants) 288 additional plants were seeded later; and
4. 8 flats of three inch peat pots sown with Vernal alfalfa (20 pots per flat).

After the seeds had germinated, the plants were thinned to one plant per pellet. Since it was not feasible to thin the alfalfa, the alfalfa plants were counted in each pot, and recorded on wooden pot labels.

Because buds, flowers and fruit act as sinks for the auxins, it is desirable to treat the herbaceous plants at least several days before bud formation to permit the compounds and compositions to exert their systemic effect on the entire plant. Since the Tiny Tim tomatoes formed buds, the buds were pinched off all the tomato plants including the controls.

The plants were prepared for spraying by selecting three tomato plants, three alfalfa pots, three pepper and three soybean plants, avoiding only those which has germinated rather late, labeling each in indelible ink on a wooden pot label as to spray and strength, placing them in a plastic flat and packing peat moss around them to hold sufficient water for the plants' needs. Each flat was taken to a distant place and sprayed to drip-off on leaves and stems with the appropriate spray about 6 weeks after seeding. The flat was then placed on a table and isolated from the others so that subsequent waterings prior to planting would not cause contamination among the flats. All plants were sprayed to drip-off only once except for those identified A +B, A + C, 2 AB and 2 AC which were sprayed twice.

45 spray batches of the peppers were prepared as described above, 15 spray batches in each strength, being sprayed with the following compounds and compositions:

| A | F | AF |
|---|---|---|
| B | AB | A + B |
| C | AC | A + C |
| D | AD | 2 AB |
| E | AE | 2 AC |

The A + B designation denotes serial spraying, i.e., the plant was sprayed first with compound A, and, having dried, was later sprayed with compound B on the same day. This was also done with A + C. The designation 2 AB denotes that those plants were sprayed once with composition AB on one day and again 3 days later. The same applies to 2 AC.

After the plants were sprayed and stored on tables, they were potted, about 3 days later in a greenhouse and kept under shelter. Three of the six field control peppers were also potted and sheltered in the greenhouse while three pepper plants remained in the field as controls.

The plants were potted in 6.5 inch plastic pots, using a potting soil made up in the proportions of 1 cu. ft. of peat moss, 2/3 cu. ft. of pearlite and 2/3 cu. ft. of soil plus superphosphate and dolomitic limestone in approximation of the Cornell mix. These were mixed in a cement mixer and steam sterilized at a temperature ranging up from 180° for ½ hour.

The pots were then loosely filled to the brim, and the plants planted, being watered with a nutrient solution at 200 parts per million, of potassium nitrate, calcium nitrate and ammonium nitrate. Thereafter, the plants were watered on alternate days as needed, and approximately every other watering contained the same nutrient solution as above at the same rate.

Regular observations of the plants were taken twice a week, three days apart using numerical rating criteria as follows:
1. Looks better than control plants, larger, lusher, more buds, greener, longer leaves.
2. Looks as good as the control plants, as large, as lush, as green, as many buds, leaves about as long.
3. Not as good, but close, to control plants — some, but not bad, twisting, stunting, discoloration of leaves.

4. Very stunted, twisted, browned, yellowish, smaller than controls.
5. Dead or obviously dying.

To distinguish between those plants just obviously superior to the controls and those markedly superior to the control plants, the designation O was used to denote the latter.

Photographs taken of the control plants with each of the spray batches to record the difference between the controls and treated plants not only showed height and width differences but also difference in the kind and location of the foliage. Thus the control plants have foliage only in the upper half of the plants, but the treated plants, in many cases, tend to have foliage from base to top. The treated plants have more laterals than do the control plants which intensifies their crop bearing ability and their stems are noticeably thicker and stronger.

In the ratings shown in the subsequent tables, it should be noted that the spray batch rating may vary relative to the control batch over a period of time as the control batch itself improved, and this condition is taken into account in all of the tables.

TABLE 1

California Wonder Peppers, In the Greenhouse, Sprayed With Solutions of 0.1 cc. Concentrate/Pint of Water

| SPRAY BATCH | IN THE 3RD WEEK AFTER SPRAYING | | IN THE 4TH WEEK AFTER SPRAYING | | IN THE 5TH WEEK AFTER SPRAYING | |
|---|---|---|---|---|---|---|
| | I | II | I | II | I | II |
| A | 0 | 0 | 0 | 0 | 0 | 0 |
| B | 1 | 0 | 1 | 0 | 0 | 0 |
| C | 1 | 1 | 1 | 0 | 0 | 0 |
| D | 1 | 0 | 0 | 0 | 0 | 0 |
| E* | 1 | 0 | 0 | 0 | 0 | 0 |
| F | 1 | 1 | 0 | 0 | 0 | 0 |
| AB | 1 | 2 | 1 | 0 | 0 | 0 |
| AC | 0 | 1 | 0 | 0 | 0 | 0 |
| AD | 1 | 0 | 0 | 0 | 0 | 0 |
| AE* | 0 | 1 | 0 | 0 | 0 | 0 |
| AF | 1 | 1 | 0 | 0 | 0 | 0 |
| A + B | 1 | 0 | 0 | 0 | 0 | 0 |
| A + C | 1 | 1 | 1 | 0 | 0 | 0 |
| 2 AB | 1 | 0 | 1 | 0 | 0 | 0 |
| 2 AC | 1 | 0 | 1 | 0 | 0 | 0 |
| Controls | 2 | 2 | 2 | 2 | 2 | 2 |

*Twice the indicated concentration — Same conditions for all subsequent tables in all spray strengths.
I = First reading of the week
II = Second reading 3 days later
} Same condition applies to all subsequent similar tables.

Table 1 demonstrates that every spray batch consistently outperformed the control batch except for AB alone on one date, and, that by the fifth week after spraying, every spray batch including AB was markedly superior to the control batch.

TABLE 2

California Wonder Peppers, In The Greenhouse, Sprayed With Solutions of 1.0 cc. Concentrate/Pint Of Water

| SPRAY BATCH | IN THE 3RD WEEK AFTER SPRAYING | | IN THE 4TH WEEK AFTER SPRAYING | | IN THE 5TH WEEK AFTER SPRAYING | |
|---|---|---|---|---|---|---|
| | I | II | I | II | I | II |
| A | 0 | 0 | 0 | 0 | 0 | 0 |
| B | 3 | 4 | 4 | 3 | 3 | |
| C | 2 | 3 | 2 | 3 | 3 | |
| D | 2 | 1 | 1 | 1 | 0 | |
| E | 0 | 0 | 0 | 0 | 0 | |
| F | 2 | 1 | 1 | 0 | 0 | |
| AB | 4 | 5 | 5 | 5 | 5 | |
| AC | 2 | 3 | 2 | 3 | 2 | |
| AD | 2 | 2 | 2 | 2 | 1 | |
| AE | 0 | 0 | 0 | 0 | 0 | |
| AF | 2 | 0 | 1 | 2 | 0 | |
| A + B | 3 | 5 | 5 | 4 | 3 | |
| A + C | 2 | 3 | 3 | 4 | 3 | |
| 2 AB | 4 | 5 | 5 | 5 | 4 | |
| 2 AC | 3 | 5 | 4 | 4 | 4 | |
| Controls | 2 | 2 | 2 | 2 | 2 | |

Table 2 demonstrates that at this strength, three compounds, A, D and E, and one composition, AE, consistently outperform the control batch over the entire period covered, while one compound and one composition, F and AF, respectively, eventually in the 5th week, markedly outperform the controls. Also, compound E gave a much faster start to the growth after transplanting than did the other compounds and compositions.

TABLE 3

California Wonder Peppers, In The Greenhouse, Sprayed With Solutions of 10.0 cc. Concentrate/Pint Of Water

| SPRAY BATCH | IN THE 3RD WEEK AFTER SPRAYING | | IN THE 4TH WEEK AFTER SPRAYING | | IN THE 5TH WEEK AFTER SPRAYING | |
|---|---|---|---|---|---|---|
| | I | II | I | II | I | II |
| A | 0 | 0 | 0 | 0 | 0 | 0 |
| B | 4 | 5 | 5 | 5 | 5 | |
| C | 4 | 5 | 5 | 5 | 5 | |
| D | 4 | 4 | 3 | 4 | 4 | |
| E | 1 | 0 | 0 | 0 | 0 | |
| F | 2 | 3 | 3 | 3 | 3 | |
| AB | 5 | 5 | 5 | 5 | 5 | |
| AC | 4 | 5 | 5 | 5 | 5 | |
| AD | 4 | 4 | 4 | 5 | 5 | |
| AE | 0 | 0 | 0 | 0 | 0 | |
| AF | 3 | 3 | 3 | 4 | 2 | |
| A + B | 4 | 5 | 5 | 5 | 5 | |
| A + C | 4 | 5 | 5 | 5 | 5 | |
| 2 AB | 5 | 5 | 5 | 5 | 5 | |
| 2 AC | 4 | 5 | 4 | 5 | 5 | |
| Controls | 2 | 2 | 2 | 2 | 2 | |

Table 3 indicates that two compounds and one composition, namely, A, E, and AE, consistently yield results markedly superior to the control plants. It further demonstrates that at this strength of application, two other compounds and one composition, namely D, F, and AF, are incapable of killing the plants, while the rest are capable of doing so.

Tables 4, 5 and 6 hereinafter compare and index the average plant height of each batch, the average number of formed peppers per plant of each batch and the average number of buds and flowers per plant of each batch to the same average characteristics of the control batch average plant. Thus, the total height of the plants was divided by the number of plants in the batch to secure an average plant height. The same procedure was followed for peppers, and for buds and flowers.

TABLE 4

California Wonder Peppers, In The Greenhouse, Treated With
0.1 cc./Pint Spray Solutions, Data Recorded 39 Days After
Treatment

| SPRAY BATCH | AVERAGE HEIGHT INCHES | INDEX TO CONTROL | AVERAGE NUMBER PEPPERS | INDEX TO CONTROL | AVERAGE NUMBER BUDS & FLOWERS | INDEX TO CONTROL |
|---|---|---|---|---|---|---|
| A       | 20.0  | 1.35 | 7.00 | 3.5  | 49.00 | 4.59 |
| B       | 16.0  | 1.08 | .33  | .17  | 47.00 | 4.41 |
| C       | 19.0  | 1.29 | .67  | .34  | 41.66 | 3.90 |
| D       | 20.83 | 1.41 | 2.33 | 1.17 | 46.33 | 4.34 |
| E       | 22.16 | 1.49 | 4.33 | 2.17 | 42.66 | 4.00 |
| F       | 19.16 | 1.29 | 4.33 | 2.17 | 54.00 | 5.06 |
| AB      | 20.0  | 1.35 | 0.00 | x    | 34.00 | 3.19 |
| AC      | 21.66 | 1.46 | 7.00 | 3.5  | 57.33 | 5.37 |
| AD      | 19.83 | 1.34 | 2.33 | 1.17 | 47.66 | 4.47 |
| AE      | 21.5  | 1.45 | 5.33 | 2.67 | 45.66 | 4.30 |
| AF      | 18.5  | 1.25 | 4.0  | 2.0  | 39.33 | 3.69 |
| A + B   | 21.17 | 1.43 | 2.0  | 1.0  | 54.66 | 5.12 |
| A + C   | 20.33 | 1.37 | 2.66 | 1.33 | 42.00 | 3.94 |
| 2 AB    | 21.00 | 1.42 | 3.66 | 1.83 | 49.66 | 4.65 |
| 2 AC    | 19.0  | 1.29 | 2.33 | 1.17 | 37.66 | 3.53 |
| Control | 14.83 | 1.00 | 2.00 | 1.00 | 10.67 | 1.00 |

Table 4 shows the degree of superiority of the treated plants to the untreated control plants. For example, compound A produced plants averaging 20 inches tall, indexing at 1.35 times the average control height, or 35% taller than the control plants; the A treated plants averaged 7 peppers per plant, indexing at 3.5 times the peppers on the average control plant, or, 250% more peppers than the average control plant; and the A treated plants averaged 49 buds and flowers, indexing to control as 4.59 times the average control, or 359% more buds and flowers than had the average control plant.

Table 5 also demonstrates the superiority of most of the treated plants as compared to the control plants. Particularly notable is compound F in regard to buds and flowers, standing at 4.94 times the control, or, 394% more.

It should be noted that while many of the compounds and compositions at this 1.0 cc./pint strength outperformed the controls in all characteristics noted, this strength does not yield as good results as does the 0.1 cc./pint strength solutions, shown in Table 4.

TABLE 5

California Wonder Peppers In The Greenhouse, Treated With
1.0 cc./Pint Spray Solutions, Data Recorded 39 Days After
Treatment

| SPRAY BATCH | AVERAGE HEIGHT INCHES | INDEX TO CONTROL | AVERAGE NUMBER PEPPERS | INDEX TO CONTROL | AVERAGE NUMBER BUDS & FLOWERS | INDEX TO CONTROL |
|---|---|---|---|---|---|---|
| A       | 20.33 | 1.37 | 5.67 | 2.84 | 31.67 | 2.97  |
| B       | 14.0  | .94  | 0.00 | x    | 31.00 | 2.91  |
| C       | 14.33 | .97  | 1.33 | 0.67 | 33.00 | 3.09  |
| D       | 17.83 | 1.20 | 0.00 | x    | 30.67 | 2.87  |
| E       | 21.33 | 1.44 | 7.67 | 3.84 | 29.66 | 2.78  |
| F       | 17.66 | 1.19 | 1.00 | 0.50 | 52.66 | 4.94  |
| AB      | —     | —    | —    | —    | —     | —     |
| AC      | 14.50 | 0.98 | 0.00 | x    | 32.00 | 3.00  |
| AD      | 15.50 | 1.05 | 0.00 | x    | 17.00 | 1.59  |
| AE      | 21.00 | 1.42 | 5.00 | 2.50 | 40.33 | 3.78  |
| AF      | 18.0  | 1.21 | 0.33 | 0.17 | 36.33 | 3.41  |
| A + B   | 13.16 | 0.89 | 0.00 | x    | 1.00  | 0.094 |
| A + C   | 11.67 | 0.79 | 0.00 | x    | 8.00  | 0.75  |
| 2 AB    | 6.50  | 0.44 | 0.00 | x    | 0.5   | 0.05  |
| 2 AC    | 10.50 | 0.71 | 0.00 | x    | 12.   | 1.13  |
| Control | 14.83 | 1.00 | 2.00 | 1.00 | 10.67 | 1.00  |

— = died
x = 0 quantity, no index calculated

TABLE 6

California Wonder Peppers, In The Greenhouse, Treated With
10.0 cc./Pint Spray Solutions, Data Recorded 39 Days After
Treatment

| SPRAY BATCH | AVERAGE HEIGHT INCHES | INDEX TO CONTROL | AVERAGE NUMBER PEPPERS | INDEX TO CONTROL | AVERAGE NUMBER BUDS & FLOWERS | INDEX TO CONTROL |
|---|---|---|---|---|---|---|
| A | 20.0  | 1.35 | 5.00 | 2.5 | 38.33 | 3.59 |
| B | —     | —    | —    | —   | —     | —    |
| C | 10.67 | 0.72 | 0.00 | x   | 0.00  | x    |

TABLE 6 — Continued

California Wonder Peppers, In The Greenhouse, Treated With 10.0 cc./Pint Spray Solutions, Data Recorded 39 Days After Treatment

| SPRAY BATCH | AVERAGE HEIGHT INCHES | INDEX TO CONTROL | AVERAGE NUMBER PEPPERS | INDEX TO CONTROL | AVERAGE NUMBER BUDS & FLOWERS | INDEX TO CONTROL |
|---|---|---|---|---|---|---|
| D | 11.67 | 0.79 | 0.00 | x | 0.00 | x |
| E | 19.5 | 1.32 | 0.33 | 0.17 | 39.33 | 3.69 |
| F | 11.5 | 0.78 | 0.00 | x | 10.0 | 0.94 |
| AB | — | — | — | — | — | — |
| AC | — | — | — | — | — | — |
| AD | 10.5 | 0.71 | 0.00 | x | 0.00 | x |
| AE | 19.5 | 1.32 | 2.66 | 1.33 | 41.0 | 3.84 |
| AF | 13.75 | 0.93 | 0.00 | x | 24.5 | 2.30 |
| A + B | — | — | — | — | — | — |
| A + C | — | — | — | — | — | — |
| 2 AB | — | — | — | — | — | — |
| 2 AC | — | — | — | — | — | — |
| Control | 14.83 | 1.00 | 2.00 | 1.00 | 10.67 | 1.00 |

— = died
x = 0 quantity, no index calculated

Table 6 demonstrates that some of these supposedly herbicidal compounds and compositions are capable of stimulating growth at rather a heavy rate of application. Note particularly compounds A and E, and compositions AE and AF.

It should be noted that those compounds and compositions which at this 10.0 cc./pint strength are effective in stimulating growth are not as effective as the 0.1 cc./pint strength, but are more effective than at the 1.0 cc./pint strength. For example, in regard to buds and flowers, the comparative indices from Tables 4, 5 and 6 in ascending order of spray solution strength are, for compound A, 4.59, 2.97 and 3.59; for compound E, 4.00, 2.78 and 3.69; for composition AE, 4.30, 3.78 and 3.84; and for composition AF, 3.69, 3.41, and 2.30. Only in the very last instance, AF, does the growth stimulating effect decline inversely to spray solution strength. In all the others, growth stimulation is strong at the weakest spray solution, weakest at the intermediate spray solution, and nearly as strong as the strongest spray solution as at the weakest.

At the 0.1 cc. level, in Table 4, separate serial applications of compounds A and B to the same plants gave precisely the additive quantity of extra height over control that is found by adding the growth effects of compounds A and B applied to separate plants. Table 4 shows that compounds A and B produced 35% and 8% increases, individually, and an application of A followed by an application of B produced a 43% increase. On the other hand A + C produced 37% height increase, while the additive values of compounds A and C are a 64% increase. In this instance, serial application apparently intensified the herbicidal powers of one or the other or both, but not to a degree sufficient to kill the A + C plants. Table 5 shows that at the 1.0 cc./pint rate, the additive values of height of compounds A and B, and A and C are 31% and 34% respectively, while the height difference from control of plants treated serially with compounds A + B and A + C are both negative figures, − 11% and − 21% respectively. At this rate of application, in both instances, the herbicidal property of one or the other or both of the paired compounds is enhanced by serial application. The data of Table 6 shows that at the 10.0 cc./pint rate, the A plants thrived, the B plants and the A + B plants died, while the C plants were stunted and A + C plants were killed. Thus in 5 of 6 instances, the serial association of either B or C with A tend to enhance the growth regulatory properties of both B and C.

As for the double applications of AB and AC, at the 0.1 cc. rate, Table 4 shows that one percentage point difference exists between the additive height stimulation of compounds A and B separately to individual plants and the double application of composition AB to other plants, that is, 43% and 42%, respectively, while one finds a 35 percentage point difference between the additive values of compounds A and C and the double application of composition AC, that is 64% and 29%, respectively. The double application inhibits growth relative to the single separate applications, even though the double application yielded growth in excess of control growth.

Table 5 shows that at the 1.0 cc. rate, the growth regulating properties are intensified by double application. For instance, the additive values for compounds A and B sum to 31% growth over control, while double application of AB yields growth 56% less than the control plants. The same figures for compounds A and C, and double application for composition AC are 34% over control and 29% less than control, respectively.

Table 6 shows that at the 10.0 cc. rate, single applications of compound B, and compositions AB and AC were fatal to their plants, as were double applications of AB and AC.

EXAMPLE 2

In this example, the same procedure as set forth in Example 1 was followed in treating tomatoes, alfalfa and soybean plants as well as peppers in a field experiment.

Using separate new sprayers for each spray in each strength, the spraying of the plants began on one day in mid summer and was completed four days later, having been hindered by periodic heavy rainstorms. The sprayed plants were protected from the rain by being placed on tables under tarpaulins. All the double sprayed batches were given their second treatment three days after their first treatment. Planting commenced on the day of the second spray and was completed the next day.

The plants were planted in a 3,200 square foot garden, which had been plowed earlier. The soil having been tested, the plot was treated with lime and fertilizer. The plants were planted by spray strength, that is, all the 0.1 cc., compound A, tomatoes, peppers, alfalfa and soybeans in a row, followed by the 0.1 cc, compound B, tomatoes, peppers, etc., following that pattern through all three spray strengths, ending with the control plants.

At the time of planting, it was noted that some of the 10.0 cc. plants looked especially bad, being heavily deformed by the auxins; the 1.0 cc. plants were only moderately deformed, and the 0.1 cc. plants showed but slight deformation, having started to overcome their initial deformation which had been manifest in all the plants within 24 hours of their being sprayed. As will be seen hereinafter, where significant plant stimulation occurred in the treated plants, the initial deformation disappeared.

The same numerical scale for evaluation of the plants was used here as was used for evaluating the greenhouse peppers of Example 1.

Beginning three days after planting, observations were taken at least once a week and often twice a week. The data are presented in the following tables.

TABLE 7

Tiny Tim Tomatoes, Field Grown, Treated With Spray Solutions Of Indicated Compounds And Compositions At A Strength of 0.1 cc. Concentrate/Pint Of Water

| SPRAY BATCH | IN THE 1ST WEEK AFTER SPRAYING | | IN THE 2ND WEEK AFTER SPRAYING | | IN THE 3RD WEEK AFTER SPRAYING | | IN THE 4TH WEEK AFTER SPRAYING | | IN THE 5TH WEEK AFTER SPRAYING | | IN THE 6TH WEEK AFTER SPRAYING | |
|---|---|---|---|---|---|---|---|---|---|---|---|---|
| | I | II | I | II | I | II | I | II | I | II | I | II |
| A | 2 | | 3 | | 2 | | 3 | 3 | 3 | | 3 | |
| B | 3 | | 4 | | 3 | | 4 | 4 | 4 | | 3 | |
| C | 3 | | 4 | | 3 | | 4 | 3 | 3 | | 3 | |
| D | 3 | | 3 | | 3 | | 4 | 3 | 3 | | 3 | |
| E | 2 | | 2 | | 2 | | 2 | 2 | 2 | | 3 | |
| F | 2 | | 2 | | 2 | | 2 | 2 | 1 | | 2 | |
| AB | 3 | | 4 | | 4 | | 4 | 4 | 4 | | 3 | |
| AC | 3 | | 4 | | 3 | | 3 | 3 | 3 | | 3 | |
| AD | 4 | | 3 | | 3 | | 3 | 3 | 2 | | 2 | |
| AE | 2 | | 2 | | 2 | | 2 | 2 | 2 | | 2 | |
| AF | 2 | | 3 | | 2 | | 3 | 3 | 2 | | 2 | |
| A + B | 4 | | 4 | | 4 | | 4 | 3 | 3 | | 3 | |
| A + C | 3 | | 4 | | 3 | | 3 | 3 | 3 | | 3 | |
| 2 AB | 3 | | 4 | | 4 | | 4 | 4 | 3 | | 3 | |
| 2 AC | 3 | | 3 | | 3 | | 3 | 3 | 3 | | 3 | |
| Control | 2 | | 2 | | 2 | | 2 | 2 | 2 | | 2 | |

TABLE 8

Tiny Tim Tomatoes, Field Grown, Treated With Spray Solutions Of Indicated Compounds And Compositions At A Strength Of 1.0 cc. Concentrate/Pint Of Water

| SPRAY BATCH | IN THE 1ST WEEK AFTER SPRAYING | | IN THE 2ND WEEK AFTER SPRAYING | | IN THE 3RD WEEK AFTER SPRAYING | | IN THE 4TH WEEK AFTER SPRAYING | | IN THE 5TH WEEK AFTER SPRAYING | | IN THE 6TH WEEK AFTER SPRAYING | |
|---|---|---|---|---|---|---|---|---|---|---|---|---|
| | I | II | I | II | I | II | I | II | I | II | I | II |
| A | 2 | | 3 | | 2 | | 2 | 2 | 2 | | 1 | |
| B | 4 | | 4 | | 5 | | 5 | 5 | 5 | | 5 | |
| C | 4 | | 4 | | 4 | | 4 | 4 | 4 | | 4 | |
| D | 4 | | 4 | | 4 | | 4 | 4 | 3 | | 3 | |
| E | 2 | | 2 | | 2 | | 2 | 2 | 1 | | 1 | |
| F | 3 | | 4 | | 3 | | 3 | 3 | 3 | | 3 | |
| AB | 4 | | 4 | | 5 | | 5 | 5 | 5 | | 5 | |
| AC | 4 | | 4 | | 4 | | 4 | 4 | 5 | | 4 | |
| AD | 4 | | 5 | | 5 | | 5 | 5 | 5 | | 5 | |
| AE | 2 | | 2 | | 2 | | 2 | 1 | 1 | | 1 | |
| AF | 3 | | 3 | | 3 | | 2 | 2 | 2 | | 1 | |
| A + B | 4 | | 4 | | 5 | | 5 | 5 | 5 | | 5 | |
| A + C | 4 | | 5 | | 5 | | 5 | 5 | 5 | | 5 | |
| 2 AB | 4 | | 4 | | 5 | | 5 | 5 | 5 | | 5 | |
| 2 AC | 4 | | 4 | | 5 | | 4 | 5 | 5 | | 5 | |
| Control | 2 | | 2 | | 2 | | 2 | 2 | 2 | | 2 | |

TABLE 9

Tiny Tim Tomatoes, Field Grown, Treated With Spray Solutions Of Indicated Compounds And Compositions At A Strength Of 10.0 cc. Concentrate/Pint Of Water

| SPRAY BATCH | IN THE 1ST WEEK AFTER SPRAYING | | IN THE 2ND WEEK AFTER SPRAYING | | IN THE 3RD WEEK AFTER SPRAYING | | IN THE 4TH WEEK AFTER SPRAYING | | IN THE 5TH WEEK AFTER SPRAYING | | IN THE 6TH WEEK AFTER SPRAYING | |
|---|---|---|---|---|---|---|---|---|---|---|---|---|
| | I | II | I | II | I | II | I | II | I | II | I | II |
| A | 2 | | 2 | | 2 | | 2 | 2 | 2 | | 1 | |
| B | 5 | | 5 | | 5 | | 5 | 5 | 5 | | 5 | |
| C | 4 | | 5 | | 5 | | 5 | 5 | 5 | | 5 | |
| | 5 | | 5 | | 5 | | 5 | 5 | 5 | | 5 | |
| | 3 | | 3 | | 3 | | 3 | 3 | 3 | | 2 | |

TABLE 9—Continued

Tiny Tim Tomatoes, Field Grown, Treated With Spray Solutions Of Indicated Compounds And Compositions At A Strength Of 10.0 cc. Concentrate/Pint Of Water

| SPRAY BATCH | IN THE 1ST WEEK AFTER SPRAYING I  II | | IN THE 2ND WEEK AFTER SPRAYING I  II | | IN THE 3RD WEEK AFTER SPRAYING I  II | | IN THE 4TH WEEK AFTER SPRAYNG I  II | | IN THE 5TH WEEK AFTER SPRAYING I  II | | IN THE 6TH WEEK AFTER SPRAYING I  II | |
|---|---|---|---|---|---|---|---|---|---|---|---|---|
| F | 4 | 4 | 4 | | 4 | 4 | 4 | | 4 | | | |
| AB | 4 | 5 | 5 | | 5 | 5 | 5 | | 5 | | | |
| AC | 5 | 5 | 5 | | 5 | 5 | 5 | | 5 | | | |
| AD | 5 | 5 | 5 | | 5 | 5 | 5 | | 5 | | | |
| AE | 2 | 2 | 2 | | 2 | 2 | 2 | | 2 | | | |
| AF | 4 | 4 | 5 | | 4 | 5 | 5 | | 5 | | | |
| A+B | 5 | 5 | 5 | | 5 | 5 | 5 | | 5 | | | |
| A+C | 4 | 5 | 5 | | 5 | 5 | 5 | | 5 | | | |
| 2 AB | 5 | 5 | 5 | | 5 | 5 | 5 | | 5 | | | |
| 2 AC | 5 | 5 | 5 | | 5 | 5 | 5 | | 5 | | | |
| Control | 2 | 2 | 2 | | 2 | 2 | 2 | | 2 | | | |

Tables 7, 8 and 9 show that in several instances, plants fell to relatively high number ratings but with the passage of time, gained lower number ratings, indicating that the plants both eventually withstood and benefitted from the compounds and compositions. For example, the 0.1 cc. treatment, Table 7, caused a spray batch treated with compound F to exceed the control in the fifth week after spraying, while Table 8 shows that at a rate of 1.0 cc. compounds A and E, and compositions AE and AF caused their respective plants to outperform the control plants.

With regard to the field grown peppers, the data is presented in the following Tables 10, 11 and 12.

TABLE 10

California Wonder Peppers, Field Grown, Treated With Spray Solutions Of Indicated Compounds And Compositions At A Strength Of 0.1 cc. Concentrate/Pint Of Water

| SPRAY BATCH | IN THE 1ST WEEK AFTER SPRAYING I  II | | IN THE 2ND WEEK AFTER SPRAYING I  II | | IN THE 3RD WEEK AFTER SPRAYING I  II | | IN THE 4TH WEEK AFTER SPRAYING I  II | | IN THE 5TH WEEK AFTER SPRAYING I  II | | IN THE 6TH WEEK AFTER SPRAYING I  II | |
|---|---|---|---|---|---|---|---|---|---|---|---|---|
| A | 3 | 3 | 2 | | 2 | 2 | 2 | | 2 | | 1 | |
| B | 3 | 3 | 3 | | 3 | 3 | 3 | | 3 | | 3 | |
| C | 3 | 3 | 3 | | 3 | 3 | 3 | | 2 | | 3 | |
| D | 2 | 2 | 2 | | 2 | 2 | 2 | | 2 | | 2 | |
| E | 2 | 2 | 2 | | 2 | 2 | 2 | | 2 | | 3 | |
| F | 3 | 3 | 3 | | 3 | 3 | 3 | | 3 | | 3 | |
| AB | 3 | 3 | 2 | | 2 | 2 | 2 | | 1 | | 1 | |
| AC | 2 | 3 | 3 | | 3 | 3 | 3 | | 3 | | 3 | |
| AD | 2 | 3 | 3 | | 2 | 2 | 2 | | 2 | | 3 | |
| AE | 2 | 2 | 2 | | 1 | 1 | 2 | | 2 | | 3 | |
| AF | 3 | 3 | 2 | | 2 | 2 | 2 | | 2 | | 3 | |
| A + B | 3 | 3 | 3 | | 3 | 3 | 3 | | 3 | | 3 | |
| A + C | 2 | 2 | 3 | | 2 | 2 | 2 | | 2 | | 2 | |
| 2 AB | 3 | 2 | 2 | | 3 | 2 | 2 | | 2 | | 2 | |
| 2 AC | 3 | 3 | 3 | | 3 | 3 | 3 | | 3 | | 3 | |
| Control | 2 | 2 | 2 | | 2 | 2 | 2 | | 2 | | 2 | |

TABLE 11

California Wonder Peppers, Field Grown, Treated With Spray Solutions Of Indicated Compounds And Compositions At A Strength Of 1.0 cc. Of Concentrate/Pint Of Water

| SPRAY BATCH | IN THE 1ST WEEK AFTER SPRAYING I  II | | IN THE 2ND WEEK AFTER SPRAYING I  II | | IN THE 3RD WEEK AFTER SPRAYING I  II | | IN THE 4TH WEEK AFTER SPRAYING I  II | | IN THE 5TH WEEK AFTER SPRAYING I  II | | IN THE 6TH WEEK AFTER SPRAYING I  II | |
|---|---|---|---|---|---|---|---|---|---|---|---|---|
| A | 2 | 3 | 2 | | 1 | 1 | 1 | | 1 | | | |
| B | 4 | 4 | 5 | | 5 | 5 | 5 | | 5 | | | |
| C | 4 | 5 | 5 | | 5 | 5 | 5 | | 5 | | | |
| D | 5 | 5 | 4 | | 4 | 4 | 4 | | 3 | | | |
| E | 2 | 3 | 3 | | 3 | 3 | 2 | | 2 | | | |
| F | 3 | 2 | 3 | | 3 | 3 | 3 | | 3 | | | |
| AB | 4 | 4 | 5 | | 5 | 5 | 5 | | 5 | | | |
| AC | 4 | 5 | 5 | | 5 | 5 | 5 | | 5 | | | |
| AD | 4 | 3 | 3 | | 3 | 3 | 3 | | 3 | | | |
| AE | 2 | 3 | 2 | | 1 | 1 | 1 | | 1 | | | |
| AF | 2 | 2 | 2 | | 2 | 2 | 2 | | 2 | | | |
| A + B | 3 | 4 | 5 | | 5 | 5 | 5 | | 5 | | | |
| A + C | 3 | 3 | 4 | | 4 | 4 | 4 | | 3 | | | |
| 2 AB | 4 | 5 | 5 | | 5 | 5 | 5 | | 5 | | | |
| 2 AC | 4 | 3 | 5 | | 5 | 5 | 5 | | 5 | | | |
| Control | 2 | 2 | 2 | | 2 | 2 | 2 | | 2 | | | |

TABLE 12

California Wonder Peppers, Field Grown, Treated With Spray Solutions Of Indicated Compounds And Compositions At A Strength Of 10.0 cc. Of Concentrate/Pint Of Water

| SPRAY BATCH | IN THE 1ST WEEK AFTER SPRAYING | | IN THE 2ND WEEK AFTER SPRAYING | | IN THE 3RD WEEK AFTER SPRAYING | | IN THE 4TH WEEK AFTER SPRAYING | | IN THE 5TH WEEK AFTER SPRAYING | | IN THE 6TH WEEK AFTER SPRAYING | |
|---|---|---|---|---|---|---|---|---|---|---|---|---|
| | I | II | I | II | I | II | I | II | I | II | I | II |
| A | 3 | | 3 | | 2 | | 3 | 3 | 3 | | 2 | |
| B | 4 | | 5 | | 5 | | 5 | 5 | 5 | | 5 | |
| C | 4 | | 5 | | 5 | | 5 | 5 | 5 | | 5 | |
| D | 4 | | 5 | | 5 | | 5 | 5 | 5 | | 5 | |
| E | 3 | | 3 | | 3 | | 3 | 3 | 3 | | 3 | |
| F | 4 | | 4 | | 5 | | 5 | 5 | 5 | | 5 | |
| AB | 4 | | 5 | | 5 | | 5 | 5 | 5 | | 5 | |
| AC | 5 | | 5 | | 5 | | 5 | 5 | 5 | | 5 | |
| AD | 5 | | 5 | | 5 | | 5 | 5 | 5 | | 5 | |
| AE | 3 | | 3 | | 2 | | 2 | 2 | 3 | | 3 | |
| AF | 4 | | 5 | | 5 | | 5 | 5 | 5 | | 5 | |
| A + B | 4 | | 5 | | 5 | | 5 | 5 | 5 | | 5 | |
| A + C | 4 | | 5 | | 5 | | 5 | 5 | 5 | | 5 | |
| 2 AB | 4 | | 5 | | 5 | | 5 | 5 | 5 | | 5 | |
| 2 AC | 4 | | 5 | | 5 | | 5 | 5 | 5 | | 5 | |
| Controls | 2 | | 2 | | 2 | | 2 | 2 | 2 | | 2 | |

These tables indicate that the peppers responded more favorably at the lower strengths than did the tomatoes. For example, those in Table 10 treated with compound A and with composition AB progressed over time to a condition superior to the control plants, while those treated with composition AE surpassed the controls in the fourth week after spraying and fell thereafter.

While many of the plants in Table 11 suffered from 1.0 cc. spray strengths, it should be noted that compound A and composition AE both caused their plants to rather decisively exceed control plant growth by the fourth week after spraying and to maintain that condition thereafter. One should also note that compound E plants at this strength fell to just below control performance for three and one-half weeks, and ended the observation period on an upward trend. In no instance in Table 12, at 10.0 cc./pint, did any plants exceed control, although those treated with compound A came to equal the control.

The Adelphia soybean data is presented in the following Tables 13, 14 and 15.

TABLE 13

Adelphia Soybeans, Field Grown, Treated With Spray Solutions Of Indicated Compounds And Compositions At A Strength Of 0.1 cc. Of Concentrate/Pint Of Water

| SPRAY BATCH | IN THE 1ST WEEK AFTER SPRAYING | | IN THE 2ND WEEK AFTER SPRAYING | | IN THE 3RD WEEK AFTER SPRAYING | | IN THE 4TH WEEK AFTER SPRAYING | | IN THE 5TH WEEK AFTER SPRAYING | | IN THE 6TH WEEK AFTER SPRAYING | |
|---|---|---|---|---|---|---|---|---|---|---|---|---|
| | I | II | I | II | I | II | I | II | I | II | I | II |
| A | 2 | | 2 | | 2 | | 2 | 3* | 2** | | 2 | |
| B | 4 | | 3 | | 3 | | 3 | 3 | 2 | | 2 | |
| C | 3 | | 2 | | 2 | | 2 | 2 | 2 | | 2 | |
| D | 4 | | 4 | | 5 | | 5 | 5 | 4 | | 4 | |
| E | 2 | | 2 | | 2 | | 2 | 2 | 2 | | 2 | |
| F | 4 | | 4 | | 4 | | 3 | 3 | 3 | | 3 | |
| AB | 4 | | 4 | | 2 | | 3 | 3 | 2 | | 2 | |
| AC | 4 | | 3 | | 3 | | 3 | 2 | 2 | | 3 | |
| AD | 4 | | 5 | | 5 | | 5 | 5 | 5 | | 5 | |
| AE | 3 | | 3 | | 2 | | 1 | 1 | 1 | | 2 | |
| AF | 3 | | 3 | | 3 | | 3 | 3 | 3 | | 3 | |
| A + B | 3 | | 3 | | 2 | | 1 | 1 | 1 | | 2 | |
| A + C | 3 | | 2 | | 3 | | 2 | 2 | 2 | | 3 | |
| 2 AB | 4 | | 3 | | 2 | | 2 | 2 | 2 | | 3 | |
| 2 AC | 3 | | 3 | | 2 | | 3 | 3 | 2 | | 3 | |
| Controls | 2 | | 2 | | 2 | | 2 | 2 | 2 | | 2 | |

*Soil Problem – low spot – rain gathers and lays, ground surface mossy.
**Soil was limed on whole plot.

TABLE 14

Adelphia Soybeans, Field Grown, Treated With Spray Solutions Of Indicated Compounds And Compositions At A Strength Of 1.0 cc. Of Concentrate/Pint Of Water

| SPRAY BATCH | IN THE 1ST WEEK AFTER SPRAYING I | II | IN THE 2ND WEEK AFTER SPRAYING I | II | IN THE 3RD WEEK AFTER SPRAYING I | II | IN THE 4TH WEEK AFTER SPRAYING I | II | IN THE 5TH WEEK AFTER SPRAYING I | II | IN THE 6TH WEEK AFTER SPRAYING I | II |
|---|---|---|---|---|---|---|---|---|---|---|---|---|
| A | 2 | 2 | | | 2 | | 2 | 2 | 2 | | 2 | |
| B | 5 | 5 | | | 5 | | 5 | 5 | 5 | | 5 | |
| C | 4 | 4 | | | 3 | | 4 | 4 | 3 | | 3 | |
| D | 5 | 5 | | | 5 | | 5 | 5 | 5 | | 5 | |
| E | 4 | 3 | | | 2 | | 2 | 2 | 2 | | 2 | |
| F | 5 | 5 | | | 5 | | 5 | 5 | 5 | | 5 | |
| AB | 5 | 5 | | | 5 | | 5 | 5 | 5 | | 5 | |
| AC | 4 | 5 | | | 5 | | 5 | 5 | 5 | | 5 | |
| AD | 5 | 5 | | | 5 | | 5 | 5 | 5 | | 5 | |
| AE | 2 | 2 | | | 2 | | 2 | 2 | 2 | | 1 | |
| AF | 5 | 5 | | | 5 | | 5 | 5 | 5 | | 5 | |
| A + B | 5 | 5 | | | 5 | | 5 | 5 | 5 | | 5 | |
| A + C | 4 | 5 | | | 5 | | 5 | 5 | 5 | | 5 | |
| 2 AB | 4 | 5 | | | 5 | | 5 | 5 | 5 | | 5 | |
| 2 AC | 4 | 5 | | | 5 | | 5 | 5 | 5 | | 5 | |
| Controls | 2 | 2 | | | 2 | | 2 | 2 | 2 | | 2 | |

TABLE 15

Adelphia Soybeans, Field Grown, Treated With Spray Solutions Of Indicated Compounds And Compositions At A Strength Of 10.0 cc. Of Concentrate/Pint Of Water

| SPRAY BATCH | IN THE 1ST WEEK AFTER SPRAYING I | II | IN THE 2ND WEEK AFTER SPRAYING I | II | IN THE 3RD WEEK AFTER SPRAYING I | II | IN THE 4TH WEEK AFTER SPRAYING I | II | IN THE 5TH WEEK AFTER SPRAYING I | II | IN THE 6TH WEEK AFTER SPRAYING I | II |
|---|---|---|---|---|---|---|---|---|---|---|---|---|
| A | | 3 | 2 | | 2 | | 2 | 2 | 2 | | 2 | |
| B | | 5 | 5 | | 5 | | 5 | 5 | 5 | | 5 | |
| C | | 5 | 5 | | 5 | | 5 | 5 | 5 | | 5 | |
| D | | 5 | 5 | | 5 | | 5 | 5 | 5 | | 5 | |
| E | | 4 | 2 | | 3 | | 2 | 2 | 2 | | 2 | |
| F | | 5 | 5 | | 5 | | 5 | 5 | 5 | | 5 | |
| AB | | 5 | 5 | | 5 | | 5 | 5 | 5 | | 5 | |
| AC | | 5 | 5 | | 5 | | 5 | 5 | 5 | | 5 | |
| AD | | 5 | 5 | | 5 | | 5 | 5 | 5 | | 5 | |
| AE | | 3 | 2 | | 2 | | 1 | 1 | 1 | | 1 | |
| AF | | 5 | 5 | | 5 | | 5 | 5 | 5 | | 5 | |
| A + B | | 5 | 5 | | 5 | | 5 | 5 | 5 | | 5 | |
| A + C | | 5 | 5 | | 5 | | 5 | 5 | 5 | | 5 | |
| 2 AB | | 5 | 5 | | 5 | | 5 | 5 | 5 | | 5 | |
| 2 AC | | 5 | 5 | | 5 | | 5 | 5 | 5 | | 5 | |
| Controls | | 2 | 2 | | 2 | | 2 | 2 | 2 | | 2 | |

The soybeans responded somewhat differently to the sprays. Those of Table 13 treated at 0.1 cc/pint concentration with composition AE begin wiht a rating of 3, pass briefly through 2 and rise to 1, exceeding control for three observations, reverting to 2 at the last observation. Those treated with compounds A +B did exactly the same.

Among those treated with 1.0 cc. sprays, many were severly affected by their sprays, while those treated with compound A performed consistently with the control plants, and those treated with composition AE eventually surpassed the control plants. Some of those treated in Table 15 at 10.0 cc. strength also suffered, but it should be noted that those treated with this strength of compound A perform consistently with the control plants, while those treated with composition AE rather quickly exceeded the control plants and have maintained their superiority. It should be noted that plants treated with compound A consistently match the control; those treated with compound E fall below, then rise to match the control. Plants treated with composition AE exceed the control in the sixth week after spraying, indicating positive synergy.

The date regarding alfalfa is shown in Tables 16, 17 and 18.

TABLE 16

Vernal Alfalfa, Field Grown, Treated With Spray Solutions Of Indicated Compounds And Compositions At A Strength Of 0.1 cc. Of Concentrate/Pint Of Water

| SPRAY BATCH | IN THE 1ST WEEK AFTER SPRAYING I | II | IN THE 2ND WEEK AFTER SPRAYING I | II | IN THE 3RD WEEK AFTER SPRAYING I | II | IN THE 4TH WEEK AFTER SPRAYING I | II | IN THE 5TH WEEK AFTER SPRAYING I | II | IN THE 6TH WEEK SPRAYING I | II |
|---|---|---|---|---|---|---|---|---|---|---|---|---|
| A | | 4 | 3 | | 3 | | 3 | 3 | 3 | | 3 | |
| B | | 4 | 3 | | 4 | | 4 | 4 | 4 | | 3 | |
| C | | 4 | 3 | | 3 | | 3 | 3 | 2 | | 3 | |

TABLE 16—Continued

Vernal Alfalfa, Field Grown, Treated With Spray Solutions Of Indicated Compounds And Compositions At A Strength Of 0.1 cc. Of Concentrate/Pint Of Water

| SPRAY BATCH | IN THE 1ST WEEK AFTER SPRAYING I | II | IN THE 2ND WEEK AFTER SPRAYING I | II | IN THE 3RD WEEK AFTER SPRAYING I | II | IN THE 4TH WEEK AFTER SPRAYING I | II | IN THE 5TH WEEK AFTER SPRAYING I | II | IN THE 6TH WEEK AFTER SPRAYING I | II |
|---|---|---|---|---|---|---|---|---|---|---|---|---|
| D | 5 | | 4 | | 4 | | 4 | 3 | 3 | | 3 | |
| E | 2 | | 3 | | 2 | | 2 | 1 | 1 | | 1 | |
| F | 2 | | 3 | | 3 | | 3 | 3 | 2 | | 2 | |
| AB | 4 | | 3 | | 3 | | 3 | 3 | 3 | | 3 | |
| AC | 5 | | 4 | | 4 | | 4 | 4 | 4 | | 3 | |
| AD | 5 | | 5 | | 5 | | 5 | 4 | 4 | | 3 | |
| AE | 3 | | 3 | | 3 | | 2 | 2 | 2 | | 2 | |
| AF | 4 | | 3 | | 3 | | 2 | 2 | 2 | | 2 | |
| A + B | 5 | | 5 | | 4 | | 4 | 4 | 4 | | 3 | |
| A + C | 4 | | 4 | | 4 | | 4 | 3 | 3 | | 3 | |
| 2 AB | 4 | | 4 | | 4 | | 3 | 3 | 3 | | 3 | |
| 2 AC | 4 | | 4 | | 4 | | 3 | 3 | 3 | | 3 | |
| Controls 2 | 2 | | 2 | | 2 | | 2 | 2 | 2 | | | |

TABLE 17

Vernal Alfalfa, Field Grown, Treated With Spray Solutions Of Indicated Compounds And Compositions At A Strength Of 1.0 cc. Of Concentrate/Pint Of Water

| SPRAY BATCH | IN THE 1ST WEEK AFTER SPRAYING I | II | IN THE 2ND WEEK AFTER SPRAYING I | II | IN THE 3RD WEEK AFTER SPRAYING I | II | IN THE 4TH WEEK AFTER SPRAYING I | II | IN THE 5TH WEEK AFTER SPRAYING I | II | IN THE 6TH WEEK AFTER SPRAYING I | II |
|---|---|---|---|---|---|---|---|---|---|---|---|---|
| A | 2 | | 2 | | 2 | | 2 | 2 | 2 | | 2 | |
| B | 5 | | 5 | | 5 | | 5 | 5 | 5 | | 5 | |
| C | 4 | | 3 | | 3 | | 3 | 3 | 3 | | 3 | |
| D | 4 | | 4 | | 5 | | 3 | 3 | 4 | | 3 | |
| E | 2 | | 2 | | 3 | | 3 | 3 | 3 | | 3 | |
| F | 4 | | 3 | | 4 | | 4 | 4 | 4 | | 3 | |
| AB | 5 | | 4 | | 4 | | 5 | 5 | 5 | | 5 | |
| AC | 5 | | 5 | | 4 | | 5 | 4 | 4 | | 3 | |
| AD | 4 | | 3 | | 4 | | 3 | 3 | 3 | | 3 | |
| AE | 2 | | 2 | | 2 | | 2 | 2 | 2 | | 1 | |
| AF | 4 | | 3 | | 4 | | 3 | 3 | 3 | | 3 | |
| A + B | 4 | | 3 | | 4 | | 3 | 3 | 3 | | 3 | |
| A + C | 5 | | 4 | | 4 | | 3 | 3 | 3 | | 3 | |
| 2 AB | 4 | | 5 | | 5 | | 5 | 5 | 5 | | 5 | |
| 2 AC | 4 | | 4 | | 4 | | 4 | 5 | 4 | | 3 | |
| Controls | 2 | | 2 | | 2 | | 2 | 2 | 2 | | 2 | |

TABLE 18

Vernal Alfalfa, Field Grown, Treated With Spray Solutions Of Indicated Compounds And Compositions At A Strength Of 10.0 cc. Of Concentrate/Pint Of Water

| SPRAY BATCH | IN THE 1ST WEEK AFTER SPRAYING I | II | IN THE 2ND WEEK AFTER SPRAYING I | II | IN THE 3RD WEEK AFTER SPRAYING I | II | IN THE 4TH WEEK AFTER SPRAYING I | II | IN THE 5TH WEEK AFTER SPRAYING I | II | IN THE 6TH WEEK AFTER SPRAYING I | II |
|---|---|---|---|---|---|---|---|---|---|---|---|---|
| A | 4 | 2 | 2 | | 2 | | 2 | 2 | 2 | | 2 | |
| B | 4 | 5 | 5 | | 5 | | 5 | 5 | 5 | | 4 | |
| C | 5 | 5 | 5 | | 5 | | 5 | 5 | 5 | | 5 | |
| D | 5 | 5 | 3 | | 5 | | 5 | 5 | 5 | | 5 | |
| E | 3 | 2 | 5 | | 2 | | 2 | 2 | 2 | | 2 | |
| F | 5 | 4 | 5 | | 5 | | 4 | 4 | 4 | | 3 | |
| AB | 5 | 5 | 5 | | 5 | | 5 | 5 | 5 | | 5 | |
| AC | 5 | 5 | 5 | | 5 | | 5 | 5 | 5 | | 5 | |
| AD | 5 | 5 | 5 | | 5 | | 5 | 5 | 5 | | 5 | |
| AE | 3 | 2 | 2 | | 2 | | 2 | 2 | 2 | | 2 | |
| AF | 4 | 4 | 5 | | 5 | | 4 | 5 | 5 | | 5 | |
| A + B | 5 | 5 | 5 | | 5 | | 5 | 5 | 5 | | 5 | |
| A + C | 5 | 5 | 5 | | 5 | | 5 | 5 | 5 | | 5 | |
| 2 AB | 5 | 5 | 5 | | 5 | | 5 | 5 | 5 | | 5 | |
| 2 AC | 5 | 5 | 5 | | 5 | | 5 | 5 | 5 | | 5 | |
| Controls | 2 | 2 | 2 | | 2 | | 2 | 2 | 2 | | 2 | |

At the 0.1 cc. rate, shown in Table 16, the alfalfa responded favorably to only compound E, although compound F plants and composition AE and AF plants did perform comparably to control plants. Some of the alfalfa plants which early appeared to be dead or dying (rated 5) later recovered and rose to ratings of 3. The same is true of those treated with compound D, and compositions AC, AD and A +B.

Only one spray batch in Table 17, at the 1.0 cc. strength, exceeded control. It was the batch treated with composition AE, and strongly suggests positive snyergy; for those plants treated with compound A are consistently rated at 2, while those treated with compound E began at 2, but then fell consistently to 3. Those treated with composition AE hovered at 2, eventually rising to a rating of 1. Thus A and E in composition outperform A and E as separate compounds.

None of the treated plants at 10.0 cc. exceed control, but those treated with compound A and E and composition AE equal the control.

The non-uniform responses of the different types of plants to identical spray treatment should be noted. All plants were sprayed to drip-off. It would appear that the ratio of surface to bulk or volume of the plant is operative. For example, the tomato and pepper plants appear to have a lower surface to bulk ratio than do the soybeans and the alfalfa. Thus the soybean and alfalfa plants, receiving equal spraying to drip-off with the tomatoes and peppers, appear to have actually received a larger dose per unit of bulk or volume of plant than did the tomatoes and peppers with the result that the tomatoes and peppers outperformed the soybean and alfalfa plants.

It should be noted that the superiority of the greenhouse tests of Example 1 over the field tests of Example 2 is due at least in part to the fact that the greenhouse plants were regularly fertilized whereas the field plants were not. Hence the results of the greenhouse tests are probably more valid.

EXAMPLE 3

Ninety Douglas Firs, 2 years old and already planted in a field, were sprayed towards the end of summer to drip-off with spray solutions in the three strengths and respective parts per million set forth in Example 1.

Only healthy trees were used, i.e., those which were not broken, browned, split, etc. In spray batches of two trees each, the trees were appropriately labelled with a plastic, self-locking label, indicating the spray and strength. They were then measured for height by placing a yardstick on the right hand side of the tree, and straightening the crown to directly above the base of the tree. In so doing the topmost 2-5 branches were gathered between thumb and forefinger and then straightened to the vertical. Since this did not measure the mainstem tip, this measure, taken on day of spraying, is ignored in the data which follow. The base measure used is that taken five days later. To the extent that growth did occur in this five day period use of the five day figures as a base understates the indices. That base measure and all following measurements were taken in the same way, placing the yardstick in the same position relative to each tree each time, and measuring the height of the main stem tip, straightened over the base of the tree.

The spraying procedure was to place a large box, with one side cut away, over the individual tree, spray to drip-off reverse the box and spray to drip-off from the other side, thus spraying evenly and thoroughly. The purpose of the box was to avoid spray drift in the event of a breeze. Whenever any appreciable breeze was felt, spraying was suspended until it stopped. Since the trees were planted five feet apart in each row, and the rows were five feet apart, use of the box eliminated contamination between spray batches.

Tables 19, 20 and 21, for the 0.1 cc., 1.0 cc. and 10.0 cc. concentrate per pint sprays, present measurements taken 13 days apart, the first taken five days after spraying, the second taken 18 days after spraying. The growth of each plant as of 18 days after spraying is indexed to the plants' base measure, in the fourth column. The fifth column gives the average of the spray batch's percentage of growth over base. This average percentage is derived in the following manner. The two indices found for the compound A plants in Table 19, fourth column, are 1.022 and 1.007, and can be read as reflecting 2.2 and 0.7 percent growth. Adding those percents, and dividing by two to get their average, one gets 2.9% ÷ 2 = 1.45% average growth over base for batch A.

The last column presents an index of each spray batch's average percentage of growth over base, to the control plants' average percentage of their growth over base. Thus the last column tells how much more or less a spray batch grew, relative to the control batch.

TABLE 19

| | Douglas Firs Treated With 0.1 cc. Of Concentrate/Pint Of Water | | | | | |
|---|---|---|---|---|---|---|
| SPRAY GROUP AND PLANTS | 5 DAYS AFTER SPRAYING | | 18 DAYS AFTER SPRAYING | | AVGE. % GROWTH OVER BASE AS OF 18 DAYS AFTER SPRAYING | INDEX OF AVGE. % OF GROWTH OVER BASE TO CONTROL AVGE. % OF GROWTH OVER BASE |
| | HEIGHT (Base) | INDEX | HEIGHT | INDEX | | |
| A 1 | 17.00 | 1.000 | 17.375 | 1.022 | | |
| 2 | 17.00 | 1.000 | 17.125 | 1.007 | 1.45 | 1.93 |
| B 1 | 11.00 | 1.000 | 11.625 | 1.057 | | |
| 2 | 16.625 | 1.000 | 16.875 | 1.015 | 3.40 | 4.53 |
| C 1 | 18.50 | 1.000 | 18.875 | 1.020 | | |
| 2 | 20.50 | 1.000 | 20.625 | 1.006 | 1.30 | 1.73 |
| D 1 | 15.25 | 1.000 | 15.75 | 1.033 | | |
| 2 | 18.25 | 1.000 | 18.75 | 1.027 | 3.00 | 4.00 |
| E 1 | 16.875 | 1.000 | 17.25 | 1.022 | | |
| 2 | 17.50 | 1.000 | 18.00 | 1.029 | 2.55 | 3.40 |
| F 1 | 16.50 | 1.000 | 16.625 | 1.008 | | |
| 2 | 15.25 | 1.000 | 15.625 | 1.025 | 1.65 | 2.20 |
| AB 1 | 14.875 | 1.000 | 14.875 | 1.000 | | |
| 2 | 12.25 | 1.000 | 12.75 | 1.041 | 2.05 | 2.73 |
| AC 1 | 20.00 | 1.000 | 20.25 | 1.013 | | |
| 2 | 9.50 | 1.000 | 9.75 | 1.026 | 1.95 | 2.60 |
| AD 1 | 10.00 | 1.000 | 10.125 | 1.013 | | |
| 2 | 15.125 | 1.000 | 15.375 | 1.017 | 1.50 | 2.00 |

TABLE 19—Continued

Douglas Firs Treated With 0.1 cc. Of Concentrate/Pint Of Water

| SPRAY GROUP AND PLANTS | 5 DAYS AFTER SPRAYING HEIGHT (Base) | INDEX | 18 DAYS AFTER SPRAYING HEIGHT | INDEX | AVGE. % GROWTH OVER BASE AS OF 18 DAYS AFTER SPRAYING | INDEX OF AVGE. % OF GROWTH OVER BASE TO CONTROL AVGE. % OF GROWTH OVER BASE |
|---|---|---|---|---|---|---|
| AE 1 | 11.125 | 1.000 | 11.375 | 1.022 | | |
| 2 | 14.875 | 1.000 | 15.25 | 1.025 | 2.35 | 3.13 |
| AF 1 | 10.25 | 1.000 | 10.375 | 1.012 | | |
| 2 | 16.25 | 1.000 | 16.375 | 1.008 | 1.0 | 1.33 |
| A + B 1 | 10.50 | 1.000 | 10.75 | 1.024 | | |
| 2 | 20.00 | 1.000 | 20.50 | 1.025 | 2.45 | 3.27 |
| A + C 1 | 11.75 | 1.000 | 12.00 | 1.021 | | |
| 2 | 12.625 | 1.000 | 12.75 | 1.010 | 1.55 | 2.07 |
| 2 AB 1 | 13.50 | 1.000 | 13.625 | 1.009 | | |
| 2 | 13.50 | 1.000 | 13.875 | 1.028 | 1.90 | 2.53 |
| 2 AC 1 | 23.00 | 1.000 | 23.375 | 1.016 | | |
| 2 | 16.50 | 1.000 | 16.625 | 1.008 | 1.20 | 1.60 |
| Controls 1 | 12.75 | 1.000 | 13.00 | 1.020 | | |
| 2 | 17.125 | 1.000 | 17.125 | 1.000 | | |
| 3 | 10.875 | 1.000 | 10.75 | 0.989 | | |
| 4 | 16.75 | 1.000 | 16.875 | 1.007 | 0.75 | 1.00 |
| 5 | 21.00 | 1.000 | 21.25 | 1.012 | | |
| 6 | 14.50 | 1.000 | 14.75 | 1.017 | | |

In calculating the 0.75 figure for control plant average percentage of growth, the 1. of the 18 days after spraying index was ignored and only the sum of variations about the figure 1 was used. The reason for doing so is that it does give the percentage change over base. In other words, in the 13 days between measurements, the average control plant grew three-quarters of one percent of its original base height. The same average percentage was calculated in the same way for every spray batch in Tables 19, 20 and 21.

Table 19, detailing the effect of sprays made up of 0.1 cc. concentrates per pint of water, shows that every spray batch exceeded the control, registering average growths ranging from 1% for plants treated with composition AF to 3.4% for plants treated with compound B. The last column of the table shows that these spray batches relate to the control batch at indices of 1.33 and 4.53, respectively, having achieved from 33% to 353% more growth than the control batch.

Especially noteworthy are the effects of compounds B, D, E and F at this lowest strength, and compositions AB, AC, AD and AE as well as the three serial applications of compounds A and B, A and C and composition AB applied twice, denoted, respectively, as A + B, A + C and 2 AB The additive values for compounds A and C are 1.75%, while composition AC yields 1.95%, an instance of positive synergy.

TABLE 20

Douglas Firs Treated With 1.0 cc. Of Concentrate/Pint Of Water

| SPRAY GROUP AND PLANTS | 5 DAYS AFTER SPRAYING HEIGHT (Base) | INDEX | 18 DAYS AFTER SPRAYING HEIGHT | INDEX | AVGE. % GROWTH OVER BASE AS OF 18 DAYS AFTER SPRAYING | INDEX OF AVGE. % OF GROWTH OVER BASE TO CONTROL AVGE. % OF GROWTH OVER BASE |
|---|---|---|---|---|---|---|
| A 1 | 18.0 | 1.000 | 18.125 | 1.007 | | |
| 2 | 16.0 | 1.000 | 16.125 | 1.008 | 0.75 | 1.00 |
| B 1 | 9.625 | 1.000 | 9.875 | 9.875 | | |
| 2 | 13.50 | 1.000 | 14.00 | 1.037 | 3.15 | 4.20 |
| C 1 | 18.0 | 1.000 | 18.50 | 1.028 | | |
| 2 | 19.125 | 1.000 | 20.25 | 1.059 | 4.35 | 5.80 |
| D 1 | 12.75 | 1.000 | 13.125 | 1.029 | | |
| 2 | 12.25 | 1.000 | 12.375 | 1.010 | 1.95 | 2.60 |
| E 1 | 14.75 | 1.000 | 15.625 | 1.059 | | |
| 2 | 13.625 | 1.000 | 14.125 | 1.037 | 4.80 | 6.40 |
| F 1 | 14.125 | 1.000 | 14.375 | 1.018 | | |
| 2 | 15.50 | 1.000 | 15.875 | 1.024 | 2.10 | 2.80 |
| AB 1 | 20.50 | 1.000 | 20.625 | 1.006 | | |
| 2 | 14.00 | 1.000 | 14.25 | 1.018 | 1.20 | 1.60 |
| AC 1 | 12.625 | 1.000 | 12.875 | 1.020 | | |
| 2 | 14.50 | 1.000 | 14.75 | 1.017 | 1.85 | 2.47 |
| AD 1 | 13.625 | 1.000 | 13.875 | 1.018 | | |
| 2 | 15.375 | 1.000 | 15.75 | 1.024 | 2.10 | 2.80 |
| AE 1 | 14.00 | 1.000 | 14.25 | 1.018 | | |
| 2 | 19.50 | 1.000 | 19.625 | 1.006 | 1.20 | 1.60 |
| AF 1 | 18.25 | 1.000 | 18.625 | 1.021 | | |
| 2 | 13.25 | 1.000 | 13.75 | 1.038 | 2.95 | 3.93 |
| A + B 1 | 20.25 | 1.000 | 20.50 | 1.012 | | |
| 2 | 14.625 | 1.000 | 15.00 | 1.026 | 1.80 | 2.40 |

TABLE 20 – Continued

Douglas Firs Treated With 1.0 cc. Of Concentrate/Pint Of Water

| SPRAY GROUP AND PLANTS | 5 DAYS AFTER SPRAYING | | 18 DAYS AFTER SPRAYING | | AVGE. % GROWTH OVER BASE AS OF 18 DAYS AFTER SPRAYING | INDEX OF AVGE. % OF GROWTH OVER BASE TO CONTROL AVGE. % OF GROWTH OVER BASE |
|---|---|---|---|---|---|---|
| | HEIGHT (Base) | INDEX | HEIGHT | INDEX | | |
| A + C 1 | 18.00 | 1.000 | 18.375 | 1.021 | | |
| 2 | 16.125 | 1.000 | 16.50 | 1.023 | 2.15 | 2.87 |
| 2 AB 1 | 18.125 | 1.000 | 18.25 | 1.007 | | |
| 2 | 15.00 | 1.000 | 15.50 | 1.033 | 2.00 | 2.67 |
| 2 AC 1 | 15.00 | 1.000 | 14.875 | 0.992 | | |
| 2 | 13.125 | 1.000 | 13.50 | 1.029 | 1.05 | 1.40 |
| Controls 1 | 12.75 | 1.000 | 13.00 | 1.020 | | |
| 2 | 17.125 | 1.000 | 17.125 | 1.000 | | |
| 3 | 10.875 | 1.000 | 10.75 | 0.989 | | |
| 4 | 16.75 | 1.000 | 16.875 | 1.007 | 0.75 | 1.00 |
| 5 | 21.00 | 1.000 | 21.25 | 1.012 | | |
| 6 | 14.50 | 1.000 | 14.75 | 1.017 | | |

Table 20 shows that every spray group save that of compound A outperformed the control, by a range of 1.05% for the serial application of composition AC (denoted 2 AC) to 4.80% for compound E, yielding indices of 1.40 and 6.40, respectively, having achieved from 40% to 540% more growth in 13 days than did the control batch.

Especially noteworthy are the effects of compounds B, C, E, and F, compositions AD and AF, and the serial application batches of compounds A and C (denoted A +C) of compound AB (denoted 2 AB). It should be noted that compounds A and F sum to 2.85% while composition AF yields 2.95%, an instance of positive synergy.

TABLE 21

Douglas Firs Treated With 10.0 cc. Of Concentrate/Pint Of Water

| SPRAY GROUP AND PLANTS | 5 DAYS AFTER SPRAYING | | 18 DAYS AFTER SPRAYING | | AVGE. % GROWTH OVER BASE AS OF 18 DAYS AFTER SPRAYING | INDEX OF AVGE. % OF GROWTH OVER BASE TO CONTROL AVGE. % OF GROWTH OVER BASE |
|---|---|---|---|---|---|---|
| | HEIGHT (Base) | INDEX | HEIGHT | INDEX | | |
| A 1 | 11.625 | 1.000 | 12.125 | 1.043 | | |
| 2 | 14.50 | 1.000 | 14.875 | 1.026 | 3.45 | 4.60 |
| B 1 | 19.25 | 1.000 | 19.50 | 1.013 | | |
| 2 | 13.75 | 1.000 | 14.125 | 1.027 | 2.00 | 2.67 |
| C 1 | 12.00 | 1.000 | 12.125 | 1.010 | | |
| 2 | 20.50 | 1.000 | 20.625 | 1.006 | 0.80 | 1.07 |
| D 1 | 13.50 | 1.000 | 13.625 | 1.009 | | |
| 2 | 22.00 | 1.000 | 22.375 | 1.017 | 1.30 | 1.73 |
| E 1 | 22.125 | 1.000 | 22.375 | 1.011 | | |
| 2 | 10.625 | 1.000 | 10.75 | 1.012 | 1.15 | 1.53 |
| F 1 | 16.50 | 1.000 | 16.625 | 1.008 | | |
| 2 | 16.50 | 1.000 | 16.625 | 1.008 | 0.80 | 1.07 |
| AB 1 | 11.125 | 1.000 | 11.375 | 1.022 | | |
| 2 | 14.00 | 1.000 | 14.50 | 1.036 | 2.90 | 3.87 |
| AC 1 | 10.375 | 1.000 | 10.625 | 1.024 | | |
| 2 | 14.625 | 1.000 | 14.875 | 1.017 | 2.05 | 2.73 |
| AD 1 | 11.50 | 1.000 | 11.75 | 1.022 | | |
| 2 | 15.25 | 1.000 | 15.75 | 1.033 | 1.75 | 2.33 |
| AE 1 | 13.625 | 1.000 | 14.0 | 1.028 | | |
| 2 | 11.625 | 1.000 | 11.75 | 1.011 | 1.95 | 2.60 |
| AF 1 | 9.75 | 1.000 | 9.875 | 1.013 | | |
| 2 | 11.375 | 1.000 | 11.75 | 1.033 | 2.30 | 3.07 |
| A + B 1 | 14.125 | 1.000 | 14.625 | 1.035 | | |
| 2 | 12.50 | 1.000 | 12.875 | 1.030 | 3.75 | 5.00 |
| A + C 1 | 19.00 | 1.000 | 19.375 | 1.020 | | |
| 2 | 13.00 | 1.000 | 13.25 | 1.019 | 1.95 | 2.60 |
| 2 AB 1 | 10.625 | 1.000 | 10.125 | 0.953 | | |
| 2 | 13.375 | 1.000 | 13.25 | 0.991 | −2.75 | −3.66 |
| 2 AC 1 | 10.75 | 1.000 | 10.75 | 1.000 | | |
| 2 | 11.00 | 1.000 | 11.125 | 1.011 | 0.55 | 0.73 |
| Controls 1 | 12.75 | 1.000 | 13.0 | 1.020 | | |
| 2 | 17.125 | 1.000 | 17.125 | 1.000 | | |
| 3 | 10.875 | 1.000 | 10.75 | 0.989 | | |
| 4 | 16.75 | 1.000 | 16.875 | 1.007 | 0.75 | 1.00 |
| 5 | 21.0 | 1.000 | 21.25 | 1.012 | | |
| 6 | 14.5 | 1.000 | 14.75 | 1.017 | | |

Table 21 shows that all treated batches of the fir trees at this 10.0 cc. strength exceeded the control except for the two serial treatments using compositions AB and AC (denoted 2 AB and 2 AC). Those in excess of control exceeded the control batch by a range of from 7% for compound F to 400% for compound A plus compound B (denoted A + B), yielding indices of 1.07 and 5.00, respectively, having achieved from 7% to 400% more growth in 13 days than did the control batch.

Especially noteworthy are the effects of compounds A and B, compositions AB, AC, AD, AE, AF and the serial applications of compounds A amd B, and A and C, denoted A + B and A + C.

An overall consideration of Tables 19 to 21 shows that there is neither a direct nor an inverse relation between spray strength and growth stimulation of Douglas Firs for compound A amd for several other compounds and compositions. Consider the indices of the last column average percentage of growth stimulation for each of the three spray strengths, in ascending order of strength, for trees treated with compound A. Those indices are 1.93, 1.00, and 4.60. For compound E, they are 3.40, 6.40 and 1.53. For compound F, they are 2.20, 2.80 and 1.07. For composition AB, they are 2.73, 1.60 and 3.87. For composition AC they are 2.60, 2.47 and 2.73. For composition AD they are 2.00, 2.80 and 2.33. For composition AE they are 3.13, 1.60 and 2.60, and finally for composition AF they are 1.33, 3.93 and 3.07. Among the serial applications of compounds, for compounds A + B they are 3.27, 2.40 and 5.00. For compounds A + C they are 2.07, 2.87 and 2.60. For serially applied compositions A + B (denoted 2 AB) they are 2.53, 2.67 and −3.66. Thus there appears to be alternating ranges at low levels of application in which certain compounds have now stimulatory, now inhibitory, effects upon the growth of plants.

Concerning the serial applications A + B, A + C, 2 AB and 2 AC, the serial application of compounds A and B in Table 19, denoted A + B, results in positive synergy compared to the application of composition AB. The latter produced an average of 2.07% growth over base, while serial application of compounds A and B, yielded an average of 2.45% growth over base.

Positive synergy is also found in both Tables 20 amd 21 in the serial application of compounds A and B over the application of composition AB at the higher concentrations of 1.0 cc./pint and 10.0 cc./pint. In table 20, serial application of the compounds produced 1.80% average growth over base, while composition AB yielded only 1.20% average growth over base. In Table 21, the comparable figures are 3.75% to 2.90%.

Table 20 also demonstrates positive synergy in the serial application of compounds A and C in relation to composition AC. The relevant figures are, A + C, 2.15% growth over base, while composition AC yielded only 1.85 % growth over base.

Based on the foregoing data and observations, the preferred range of concentrations for growth stimulation of the tested plants are as follows: compound A — about 1 ppm to about 2,000 ppm; compound B — about 1 ppm to about 100 ppm; compound C — about 1 ppm to about 100 ppm; compound D — about 1 ppm to about 100 ppm; compound E — about 1 ppm to about 4,000 ppm; compound F — about 1 ppm to about 100 ppm; and compositions in the same ranges.

It should be noted that smaller, larger and/or older plants may require less or more concentration of the compounds and compositions for growth stimulation and that this can be accomplished by one skilled in the art without, however, departing from the spirit of the invention. Also, while the compositions used were aqueous emulsions or solutions, it is understood that they may also be prepared and used where possible as wettable powders for sprays, as granules, or as dispersions on carriers such as peat moss or vermiculite.

What is claimed is:

1. A method of increasing crop yield of peppers comprising applying directly to the plant N,N-di-n-propyl-4-trifluoromethyl-2,6-dinitroaniline or a chlorinated phenoxy acid or salt thereof in a concentration and amount sufficient to increase the crop yield.

2. The method of claim 1 wherein the compound is N,N-di-n-propyl-4-trifluoromethyl-2,6-dinitroaniline.

3. The method of claim 1 wherein the compound is sodium 2,4-dichlorophenoxyethyl sulfate.

4. The method of claim 1 wherein the compound is 2(2,4,5-trichlorophenoxy) propionic acid.

5. The method of claim 1 wherein the compound is P-chlorophenoxyacetic acid.

6. A method of simulating the growth of soybean and alfalfa plants comprising applying thereto N,N-di-n-propyl-4-trifluoromethyl-2,6-dinitroaniline and sodium 2,4-dichlorophenoxyethyl sulfate in a combined concentration and amount sufficient to stimulate growth.

7. A method of stimulating the growth of Douglas Firs comprising applying thereto N,N-di-n-propyl-4-trifluoromethyl-2,6-dinitroaniline and a chlorophenoxyacetic acid together or serially in a combined concentration and amount sufficient to stimulate growth.

8. The method of claim 7 wherein the chlorophenoxyacetic acid is 2,4-dichlorophenoxyacetic acid.

9. The method of claim 7 wherein the chlorophenoxyacetic acid is P-chlorophenoxyacetic acid.

10. The method of claim 7 wherein the chlorophenoxyacetic acid is 2-methyl-4-chlorophenoxyacetic acid.

* * * * *